US012608367B2

(12) United States Patent
Chauhan et al.

(10) Patent No.: US 12,608,367 B2
(45) Date of Patent: Apr. 21, 2026

(54) SYSTEM AND METHOD FOR CUSTOMIZABLE GRANULARITY FOR FORECASTS IN USER INTERFACE DRILLDOWN

(71) Applicant: Clari Inc., Sunnyvale, CA (US)

(72) Inventors: Mayank Chauhan, San Francisco, CA (US); Travis Cook, San Francisco, CA (US); Patrick Smith, Sunnyvale, CA (US); Mahesh Subedi, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 0 days.

(21) Appl. No.: 18/399,439

(22) Filed: Dec. 28, 2023

(65) Prior Publication Data

US 2025/0217350 A1    Jul. 3, 2025

(51) Int. Cl.
G06F 16/00 (2019.01)
G06F 16/242 (2019.01)
G06F 16/28 (2019.01)

(52) U.S. Cl.
CPC ........ G06F 16/2423 (2019.01); G06F 16/288 (2019.01)

(58) Field of Classification Search
CPC .......................... G06F 16/2423; G06F 16/288
USPC ....................................................... 707/765
See application file for complete search history.

(56) References Cited

U.S. PATENT DOCUMENTS

| | | | | |
|---|---|---|---|---|
| 8,468,170 B2* | 6/2013 | Bybee | .................. | G06Q 10/10 707/706 |
| 10,191,863 B2* | 1/2019 | Roberts | .................. | G06F 16/86 |
| 10,235,685 B2* | 3/2019 | Sun | ........................ | G06T 11/206 |
| 2012/0265353 A1* | 10/2012 | Silvernail | ........... | B29C 66/9672 700/282 |
| 2014/0278695 A1* | 9/2014 | Smith | .............. | G06Q 10/06313 705/7.23 |
| 2018/0322461 A1* | 11/2018 | Subedi | .................... | H04L 51/08 |
| 2020/0125424 A1* | 4/2020 | Subedi | .................... | G06F 9/542 |
| 2020/0349415 A1* | 11/2020 | Raju | ..................... | G06F 40/284 |
| 2020/0394542 A1* | 12/2020 | Buesser | ................. | G06F 18/29 |

* cited by examiner

*Primary Examiner* — Monica M Pyo
(74) *Attorney, Agent, or Firm* — WOMBLE BOND DICKINSON (US) LLP

(57) ABSTRACT

A system queries for entity data of a user from a first data source. The system displays a display panel in a user interface (UI), the display panel including measurement metrics for an account entity of the user from the entity data of the first data source. The system determines mode chaining information that specifies a chain of entity relationships between a number of entities in the entity data, where the relationships include one-to-one or one-to-many relationships. The system determines forecast information corresponding to the measurement metrics for the entities of the user. The system displays the forecast information as entity-based forecast values in the UI based on the mode chaining information, where the entity-based forecast values include a drill down of forecast values for the entities of the user.

20 Claims, 12 Drawing Sheets

100

100

104

430

```
{
    "id": "ACCOUNT_MODE",
    "displayName": "Account",
    "defaultOwnerField": "account.owner",
    "defaultRollupField": "account.annualrevenue",
    "showCount": true,
    "includeInAnalytics": false,
    "listLabel": "Account",
    "queryObject": "Account",
    "reportingObject": "Account"
},
``` defaultOwnerField
- Association between reporting object and query object reportingObject
- Highest level of object granularity queryObject
- Lowest level of object granularity

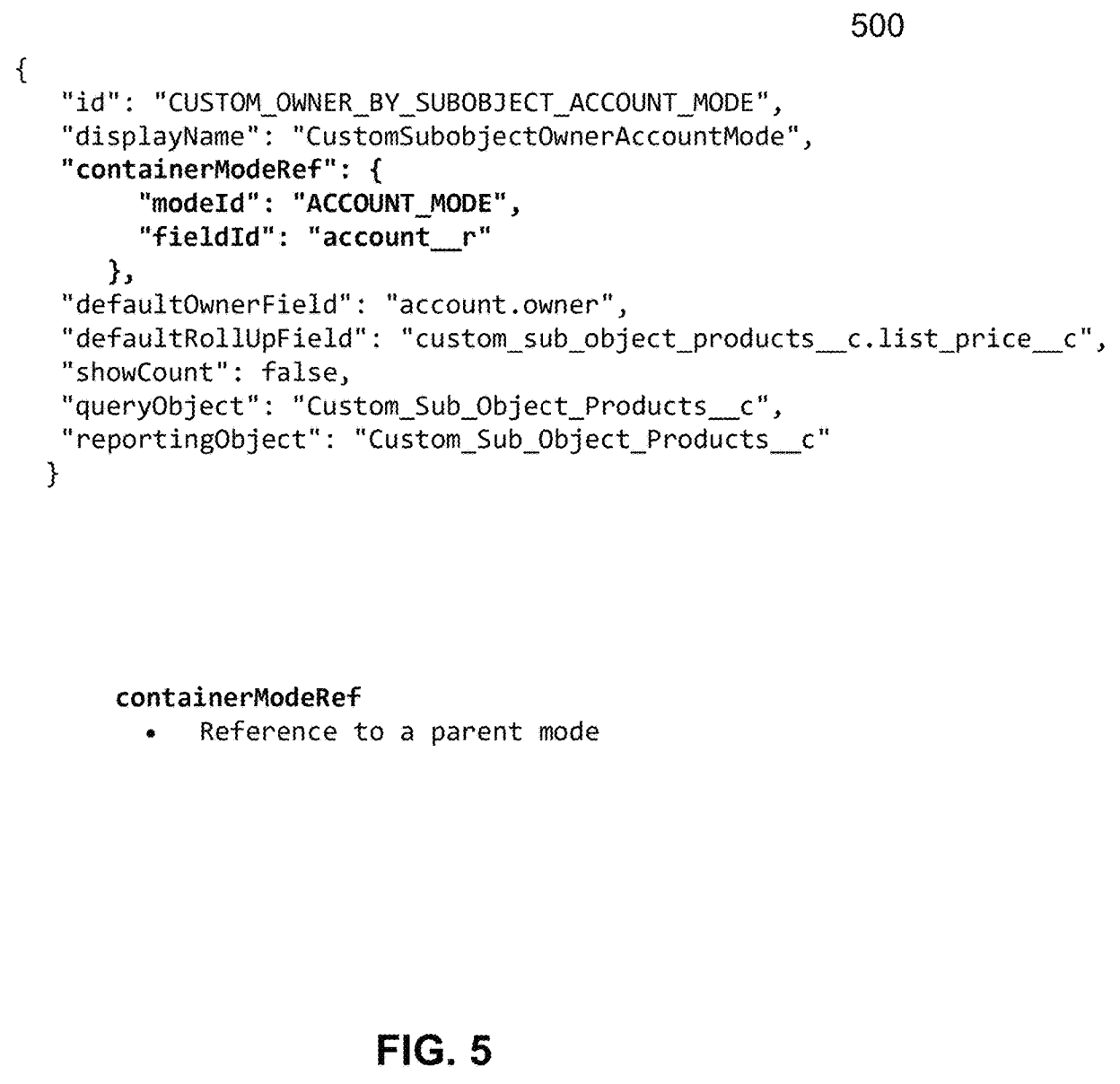

```
{
"id": "CUSTOM_OWNER_BY_SUBOBJECT_ACCOUNT_MODE",
"displayName": "CustomSubobjectOwnerAccountMode",
"containerModeRef": {
    "modeId": "ACCOUNT_MODE",
    "fieldId": "account__r"
  },
"defaultOwnerField": "account.owner",
"defaultRollupField": "custom_sub_object_products__c.list_price__c",
"showCount": false,
"queryObject": "Custom_Sub_Object_Products__c",
"reportingObject": "Custom_Sub_Object_Products__c"
}
``` containerModeRef
• Reference to a parent mode

FIG. 5

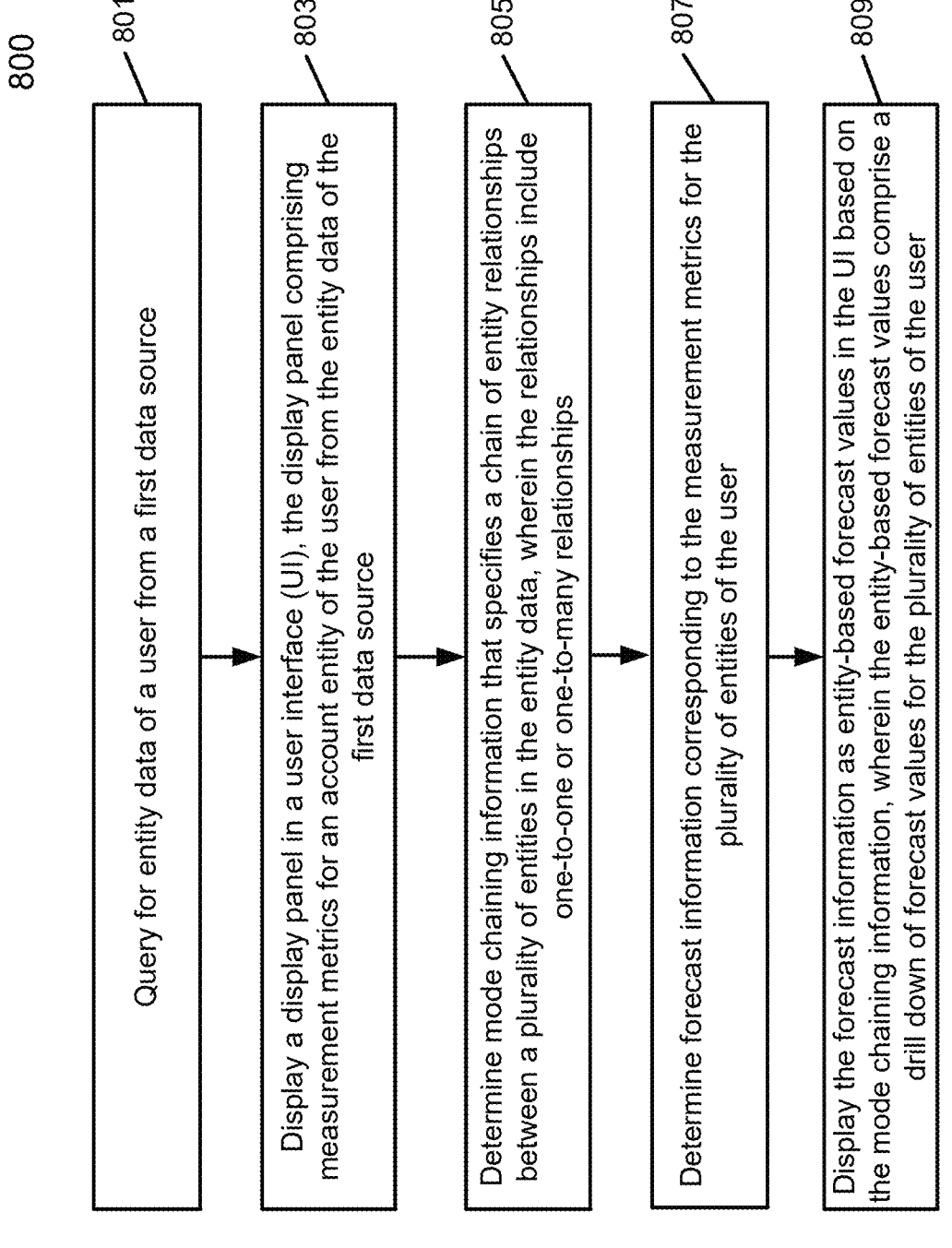

800

801
Query for entity data of a user from a first data source

803
Display a display panel in a user interface (UI), the display panel comprising measurement metrics for an account entity of the user from the entity data of the first data source 805
Determine mode chaining information that specifies a chain of entity relationships between a plurality of entities in the entity data, wherein the relationships include one-to-one or one-to-many relationships 807
Determine forecast information corresponding to the measurement metrics for the plurality of entities of the user 809
Display the forecast information as entity-based forecast values in the UI based on the mode chaining information, wherein the entity-based forecast values comprise a drill down of forecast values for the plurality of entities of the user

FIG. 8

SYSTEM AND METHOD FOR CUSTOMIZABLE GRANULARITY FOR FORECASTS IN USER INTERFACE DRILLDOWN

FIELD OF THE INVENTION

Embodiments of the present invention relate generally to data processing by a data processing system. More particularly, embodiments of the invention relate to system and method for customizable granularity for forecasts in software user interface drilldown.

BACKGROUND

Forecasting refers to the process of making predictions about future events or trends based on historical and current data. Forecasting is widely used in various fields such as cloud data usage, energy consumption, business revenue, meteorology, and technology for strategic planning and decision-making purposes. For example, businesses forecast sales to make informed budget and inventory decisions, meteorologists forecast weather patterns to issue warnings or advisories, and cloud data usage forecast trends to provide optimization guidance. Though forecasting involves an element of uncertainty, the use of scientific, statistical, and mathematical methods enhances its reliability. The accuracy of forecasts can be influenced by the quality of data, the forecasting model, the predictability of the forecasts.

BRIEF DESCRIPTION OF THE DRAWINGS

Embodiments of the invention are illustrated by way of example and not limited to the figures of the accompanying drawings in which like references indicate similar elements.

FIG. 4B illustrates an example of a mode configuration JSON according to another embodiment.

FIG. 5 illustrates an example of a mode configuration JSON according to one embodiment.

FIG. 8 is a flow diagram illustrating a process to display a UI with mode chaining according to some embodiments.

DETAILED DESCRIPTION

Figure 1A:
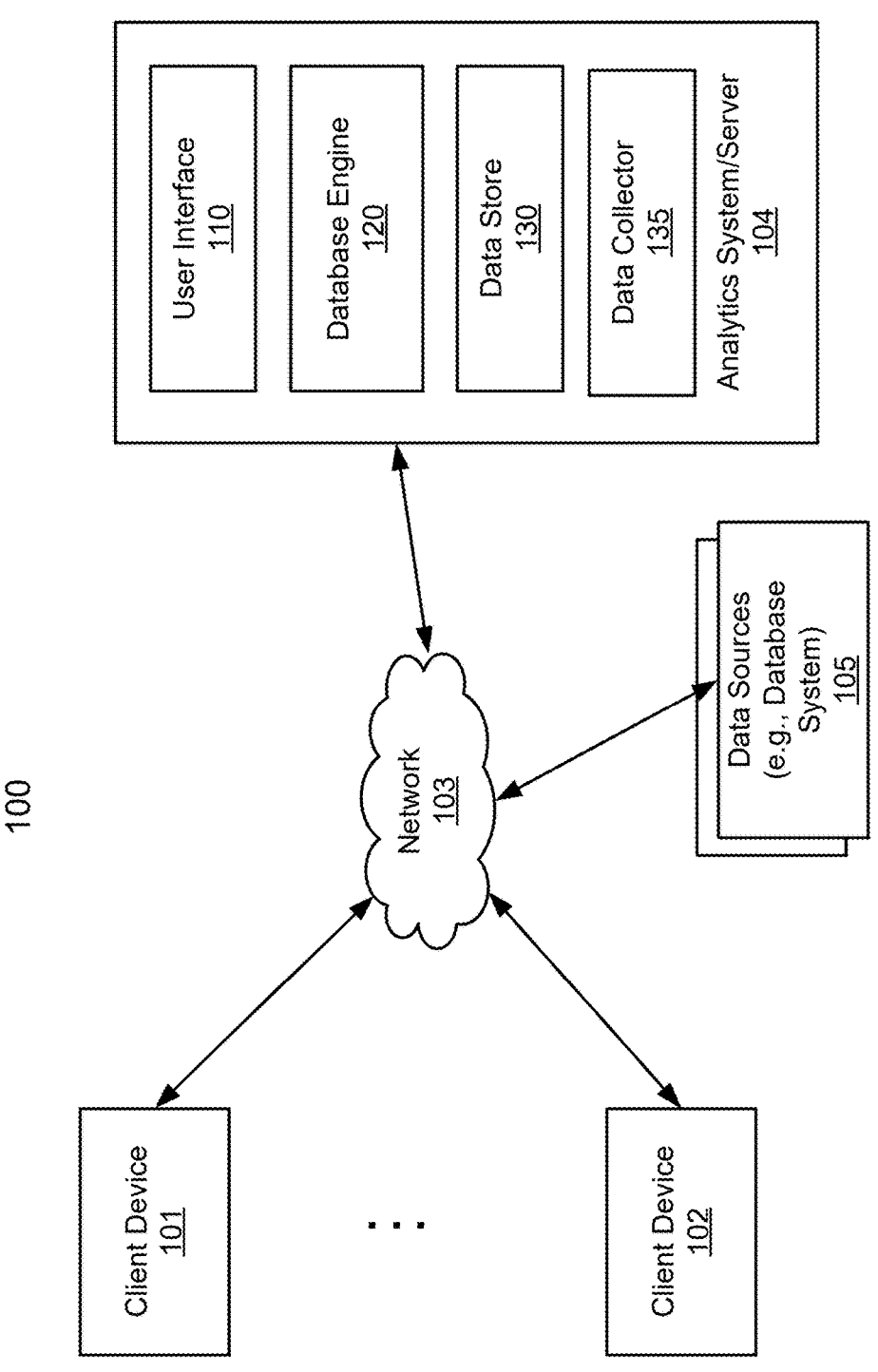
FIGS. 1A and 1B are block diagrams illustrating network configurations according to some embodiments.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, described herein are systems and methods that allows an end-user to specify forecast values in a query drill down. For example, a mode configuration tool that contains various fields including ownership and entity containments, allows an end-user to configure/customize granular levels of mode chaining information for measurement/forecasts in a user interface drilldown. Thereafter, end-users can query and fetch forecasts for sub-objects (entities) represented within their parent entity via a user interface drilldown. The depth of the entity relationships is only limited by the query and the data source. By using customizable entity levels as the mechanism for forecasting, the end-user can attain added guidance in their forecasts.

An entity relationship is a one-to-one or one-to-many relationship from a parent entity to a child entity. Example of an entity relationship is one sales account entity-to-many sales opportunity entities. E.g., there are many sales opportunities within a sales account. A sales account can refer to a sales target/prospect and a sale opportunity can refer to a qualified sales lead. Another example is sales opportunity entity to sub-opportunity entities. E.g., there are many sub-sales opportunities within a sales opportunity. A sub-opportunity entity can refer to a sales service or sales product.

Forecasting allows employees of organizations to set measurement metric (e.g., consumption, sales, revenue) targets. The targets provide attainable quotas for sales agents, and can help gauge expected revenue, aiding in budgeting and spending decisions for the organization. When measurement metrics are within target, the organization is on track for their goals. If forecasts are inaccurate, e.g., salesforecasts, consumption forecasts, growth forecasts, organizations may be misguided. Further, inaccurate forecasts can create unattainable goals for the employees of the organization.

Currently, the industry standard in software for forecasts is limiting. For example, forecasts may be limited to data from a particular data source or the forecasts may be limited to preconfigured entities. E.g., Salesforce provide forecasts limited to account entities. The forecasting, thus, is limited in providing guidance for users of an organization. Note that Salesforce is a cloud-based software company that provides customer relationship management (CRM) service and is used as an example but the forecast system can be applicable for various industries (e.g., cloud data usage, energy consumption, business revenue, meteorology, sales, etc.).

According to one embodiment, a system queries for entity data of a user from a first data source. The system displays a display panel in a user interface (UI), the display panel including measurement metrics for an account entity of the user from the entity data of the first data source. The system determines mode chaining information that specifies a chain of entity relationships between a number of entities in the entity data, where the relationships include one-to-one or one-to-many relationships. The system determines forecast information corresponding to the measurement metrics for the entities of the user. The system displays the forecast information as entity-based forecast values in the UI based on the mode chaining information, where the entity-based forecast values include a drill down of forecast values for the entities of the user.

FIG. 1A is a block diagram illustrating a network configuration according to one embodiment of the invention. Referring to FIG. 1A, system 100 includes, but is not limited to, one or more client systems 101-102 communicatively coupled to server 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Server 104 can be any kinds of servers or a cluster of servers, such as, for example, Web servers, application servers, cloud servers, backend servers, etc.

In one embodiment, server 104, which may be a cloud server, provides data analytics services to clients 101-102 based on measurement data provided by task database systems as a data source 105. Note that multiple task database systems may be implemented, where data analytics system 104 may be implemented as a multi-tenancy system that can access multiple task database systems concurrently. For example, a user of client device 101 may be associated with a first entity or organization as a first corporate client to data analytics system 104, while a user of client device 102 may be associated with a second entity or organization as a second corporate client to data analytics system 104. The first and second entities may employ different task database systems, each of which maintains a database or data structure storing a number of tasks completed or to be performed. Also note that a task database system is utilized as an example of data sources 105, however, other types of data sources or systems can also be used.

In one embodiment, data analytics system 104 includes, but it is not limited to, user interface 110, database engine 120 (also referred to as database manager, which may be part of database management software), and data store 130. User interface 110 can be any kind of user interface (e.g., Web, graphical user interface or GUI, or command line interface or CLI) that allows users of client devices 101-102 to access data analytics services provided by data analytics system 104, such as, for example, trend analysis, or pulse analysis services to be performed for various time periods. For example, via user interface 110, a user can request a trend snapshot/analysis for a set of tasks of a specific time period by specifying one or more attributes (database fields) associated with the tasks. Each of tasks can be associated with an entity (company or project or database table). Attributes can represent columns of a database table. Each entity can include numerous objects/records with at least attributes corresponding to an identifier attribute (to identify the object/record) and a modification date attribute (a time when the object/record is modified).

In response to a request received via user interface 110 from a client, such as clients 101-102, database engine 120 determines a period of time (e.g., a query time period) based on the request that the user is interested in. The query time period can be a current quarter, week, day, or year. Database engine 120 further determines a set of one or more attributes, which may be received from a user via user interface 110. Database engine 120 retrieves measurement data associated with the time period and the one or more attributes from data store 130.

Data store 130 stores or caches a variety of time-series data, such as projects, tasks, and product facts. Time-series data are data collected at different points in time. Data collector 135 can be configured to periodically collect or update data from data sources 105 to store in data store 130. For example, data collector 135 can periodically updated from corresponding data source(s) or data provider(s) 105, for example, via a periodically executed thread (which may be running as a subroutine or as a background job as a part of a housekeeping routine or thread) over a network (e.g., Internet). Alternatively, database engine 120 may dynamically access a task database system to query and retrieve measurement data using a variety of database accessing protocols associated with the task database system, such as an SQL protocol. Data stored in data store 130 can be maintained in a variety of data structures, such as one or more tables contained within one or more databases. Database engine 120 can access data store 130 via a variety of application programming interfaces (APIs), database queries, or other suitable communication protocols.

In one embodiment, database engine 120 performs data retrieval for one or more past time periods. Database engine 120 can retrieve data associated the determined past time periods from data store 130, where the retrieved data represents one or more facts. Database engine 120 can retrieve data for one or more time points for trend or pulse analysis.

Figure 1B:
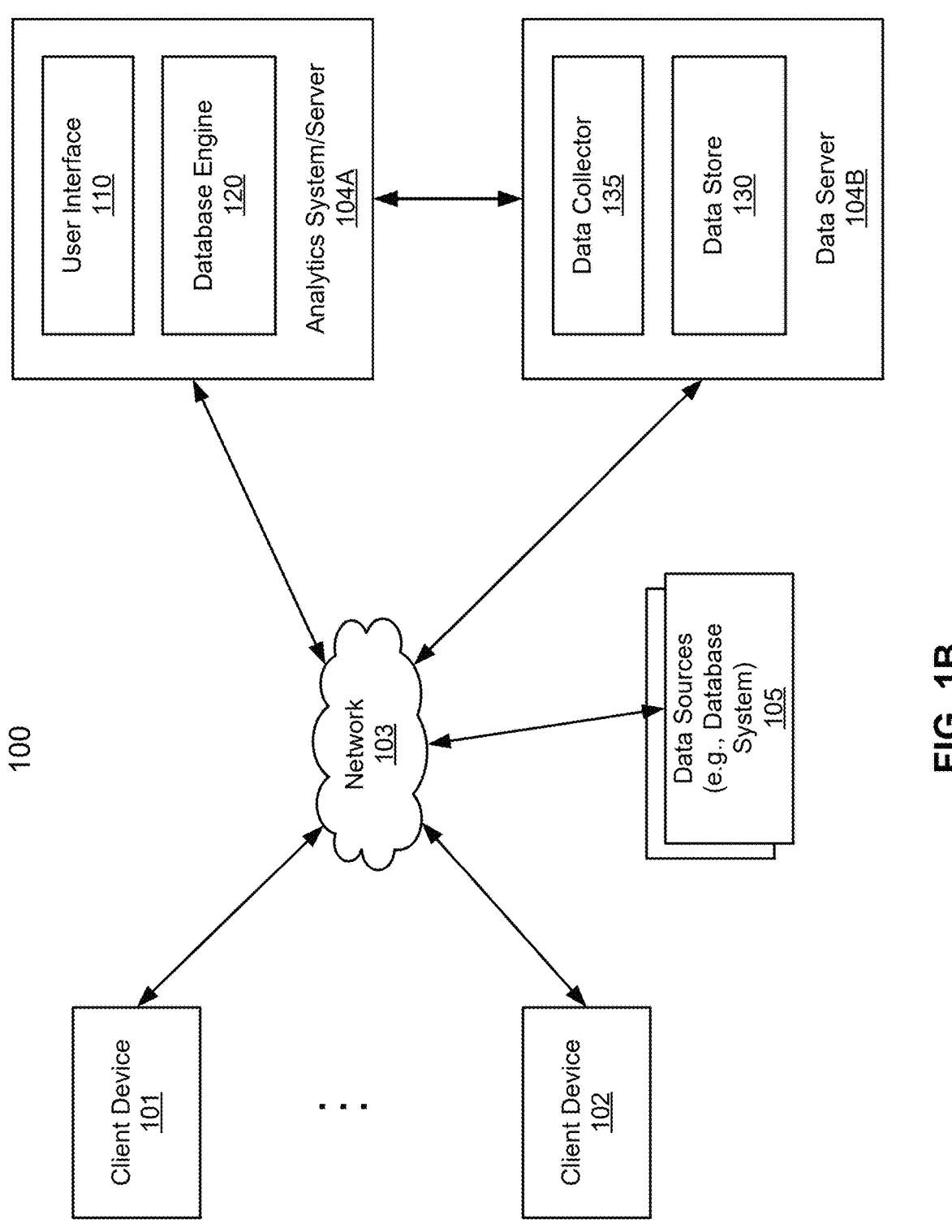

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers. Data store 130 is now maintained by data server 104B. Data server 104B can further include data collector 135 configured to periodically or constantly collect or update measurement data from data sources 105 (e.g., names for connections to databases). Data analytics server 104A can communicate with data server 104B using a variety of communication protocols to access measurement data stored in data store 130. Here, data sources 105 may not provide any forecast features nor specify any entity granular levels for display at the UI. The forecast features and the mode configurations for display can be stored at data store 130.

Figure 2:
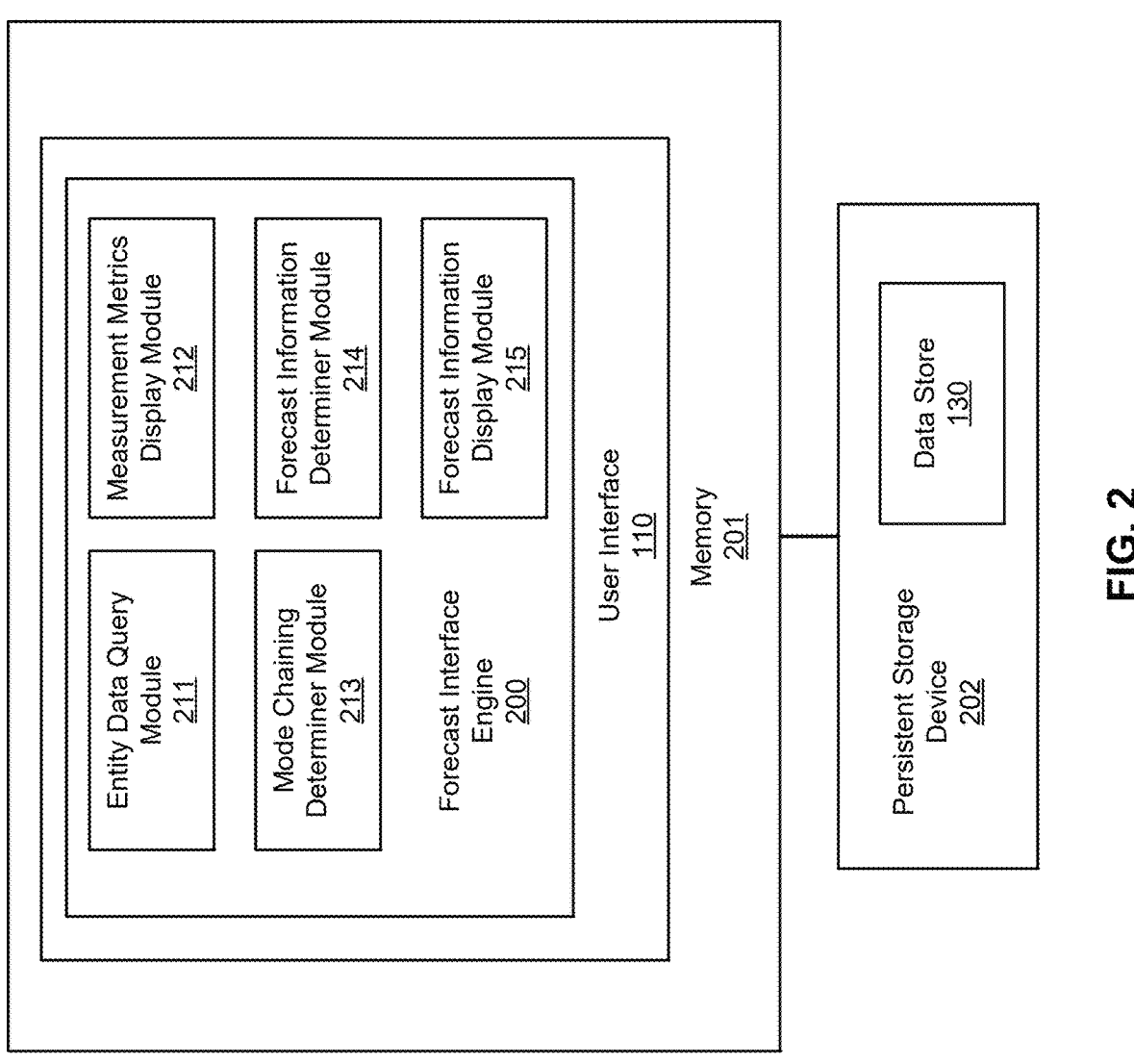
FIG. 2 is a block diagram illustrating an example of a forecast interface engine according to one embodiment.

FIG. 2 is a block diagram illustrating an example of a forecast interface engine 200 according to one embodiment. Forecast interface engine 200 can be implemented as part of user interface 110 of system 104. System 104 may be implemented as part of data analytics system 104A or server 104B. Referring to FIG. 2, system 104 includes user interface 110 and forecast interface engine 200 loaded in memory 201 and executed by one or more processors (not shown). Data store 130 can be stored in persistent storage device 202, such as a hard disk, which may be maintained locally or remotely over a network. A portion of the data stored in data store 130 can be cached in memory 201.

Forecast interface engine 200 can query for, and configure, the entity-based granularity levels, e.g., mode chaining information. In an embodiment, forecast interface engine 200 includes entity data query module 211, measurement metrics display module 212, mode chaining determiner module 213, forecast information determiner module 214, and forecast information display module 215 loaded in memory 201.

Figure 4A:
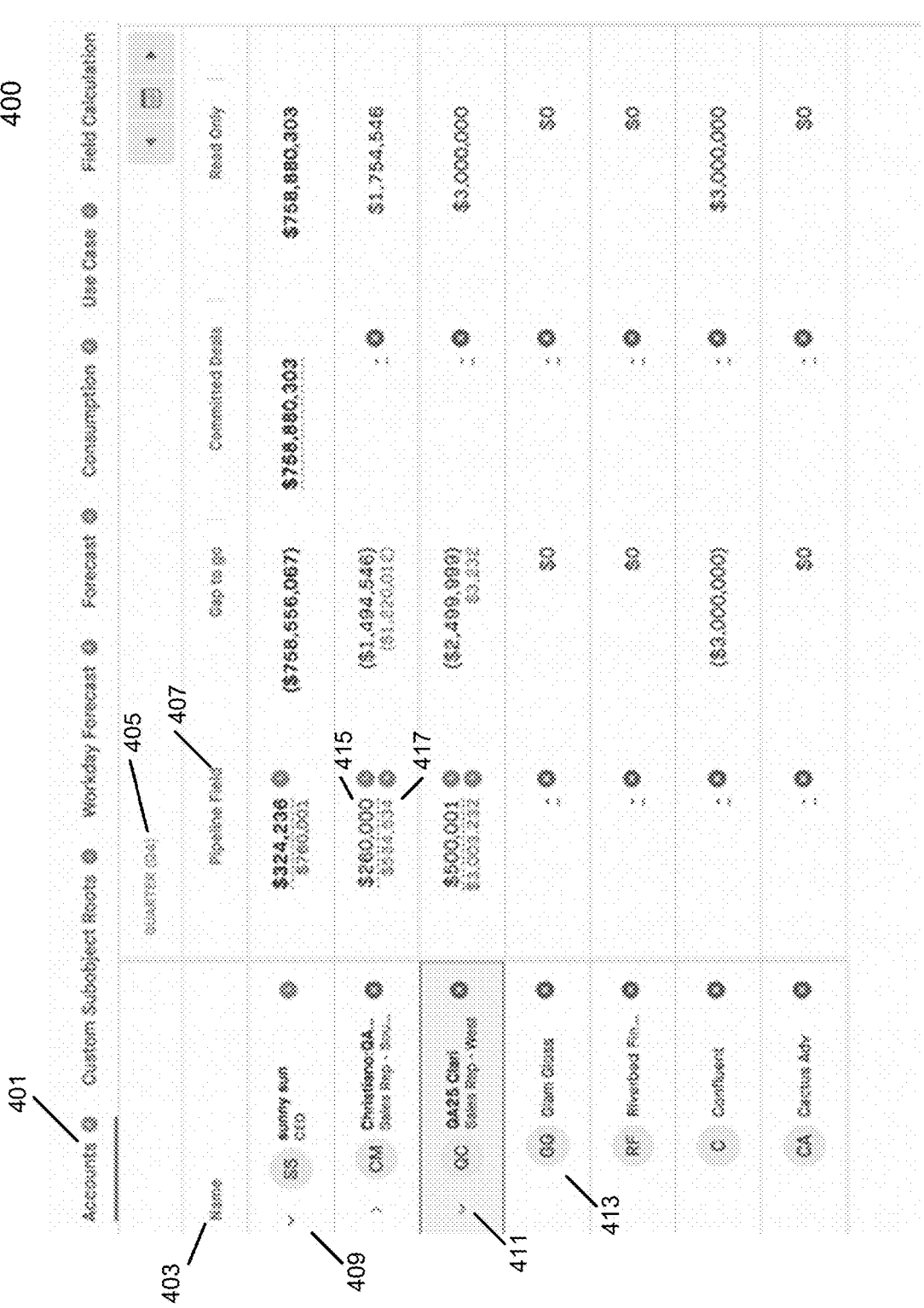
FIG. 4A illustrates a user interface with forecast values specified for account entities according to one embodiment.
Figure 4C:
FIG. 4C illustrates a mode configuration tool according to one embodiment.

Entity data query module 211 can query entity data from data sources 105. Measurement metrics display module 212 can display the measurement fields for entities in the entity data in a user interface (UI). Examples of a UI is a web browser application displaying a measurement panel and/or a forecast panel. Mode chaining determiner module 213 can retrieve the configuration modes and determine the mode chaining information, e.g., modes and links between the different modes. A configuration mode refers to a configuration setting for a query entity with respect to a reporting entity. Examples of a configuration mode setting in JSON are shown in FIG. 4B. FIG. 4C shows a configuration mode tool to customize and/or create new configuration modes. A configuration link refers to one mode referencing another mode. Mode chaining refers to a sequence of configuration modes connected through mode references or links. Example of mode references are shown in FIGS. 4A-4B. In FIG. 4A, the mode "CustomSubobjectOwnerAccount-Mode" is referencing "ACCOUNT_MODE". In FIG. 4B, the mode named "Use Case" has a reference to "Account Owner Mode". Through mode referencing, the UI can be configured to display granular levels of reporting entities specified by the mode, as further shown in FIGS. 6-7.

Forecast information determiner module 214 can determine the forecast values for any fields of an entity being displayed in a UI. Here, entity can refer to a record in a data source. Examples of entity can be account, opportunity, sub-opportunity, customizable-objects, etc. Forecast information display module 215 can display the forecast values in a UI for an end-user. Some or all of modules 211-215 may be implemented in software, hardware, or a combination thereof. Some of modules 211-215 can be integrated together as an integrated module.

Figure 3:
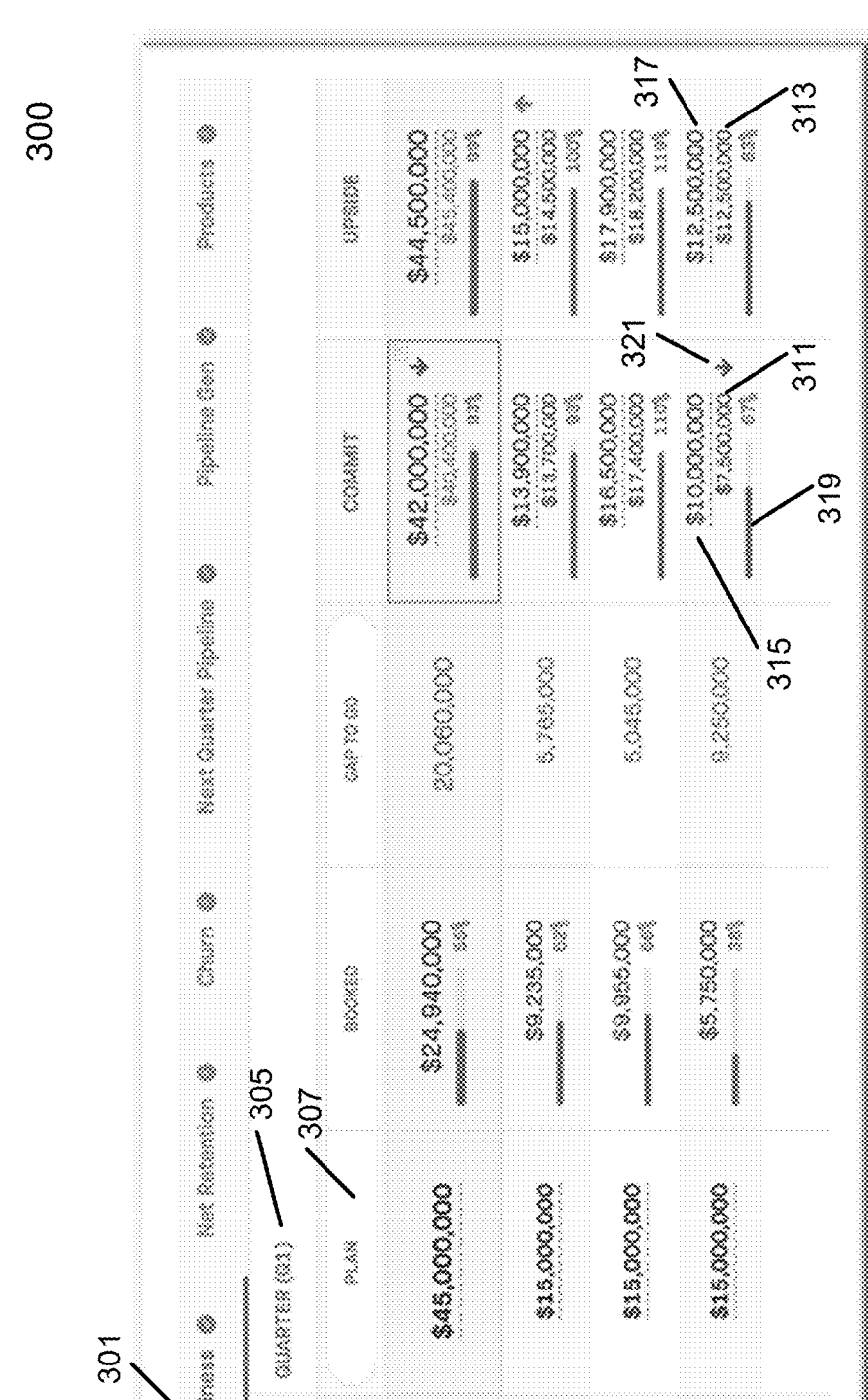
FIG. 3 illustrates a user interface with forecast values specified for user entities according to one embodiment.

FIG. 3 illustrates a user interface 300 with forecast values according to one embodiment. User interface (UI) 300 can display measurement metrics with forecast values for an organization. In one embodiment, UI 300 includes one or more display tabs 301. Each display tab can specify a unique combination of measurement metrics (e.g., a set of unique fields/columns from a data source) to be shown. As shown, in the "New Business" display tab, the measurement metrics 307 are for a timeframe 305 of quarter (Q1). The measurement metrics 307 in this example are for sales and include the fields plan, booked, gap to go, commit, and upside. The entities or records in this example are identified by name 303 and represent the name of the sales rep 309. Values 311-313 of the measurement metrics can be retrievable from a data source (such as a connection to a customer relationship management (CRM) database) periodically. Forecast values 315-317 can correspond to the values of the measurement metrics 311-313. Forecast values 315-317 can be specified by an end-user via clicking and typing in the labels (underlined) associated with the forecast values. In some embodiment, the forecast values can be entered via a textbox, dropdown, selection box, etc. In one embodiment, a percentage measurement 319 can be shown to specify the percentage value of the measurement metric divided by the forecast value. An additional incremental/decremental indicator 321 can specify if the metric has increased or decreased since the last periodic update. Although in this example, only the commit and upside measurement metrics 307 are shown with forecast values, any of the measurement metrics 307 can be shown with forecast values.

As described above, the display tab can specify a combination of measurement metrics to be displayed for entity data available from a data source and forecast values can be specified for the measurement metrics. In some embodiments, the forecast values are stored at a local data store, such as data store 130 of FIGS. 1A-1B, and the forecast values are associated to the measurement metric (e.g., a forecast value for a field of an entity). In one embodiment, forecast values can be summed for a measurement metric to display an aggregate forecast value at the parent entity level. The aggregate forecast value can suggest an initial forecast value for the parent entity. Similarly, when measurement metrics have a drilldown hierarchy of entity relationships, forecast values at child entities can be aggregated to be displayed as aggregate forecast values for the parent entity. E.g., forecast values can be specified for any measurement metrics in a drill down operation when the entities for the measurement metrics have entity relationships, such as parent entity to child entity relationships, as further described in FIGS. 6-7. An example is when an entity can be itemized. E.g., a drill-down of the entity can provide forecasts in a hierarchy of granularity levels in an UI display panel when the entity has a hierarchy of sub-entities in a hierarchy structure. In one embodiment, aggregate forecasts of sub-entities can be summed to derive an aggregate forecast value for an entity when the forecast values are specified for the sub-entities. The aggregate forecast values of the entity can provide guidance for the entity and further increase a forecast accuracy for the entity.

Figure 6:
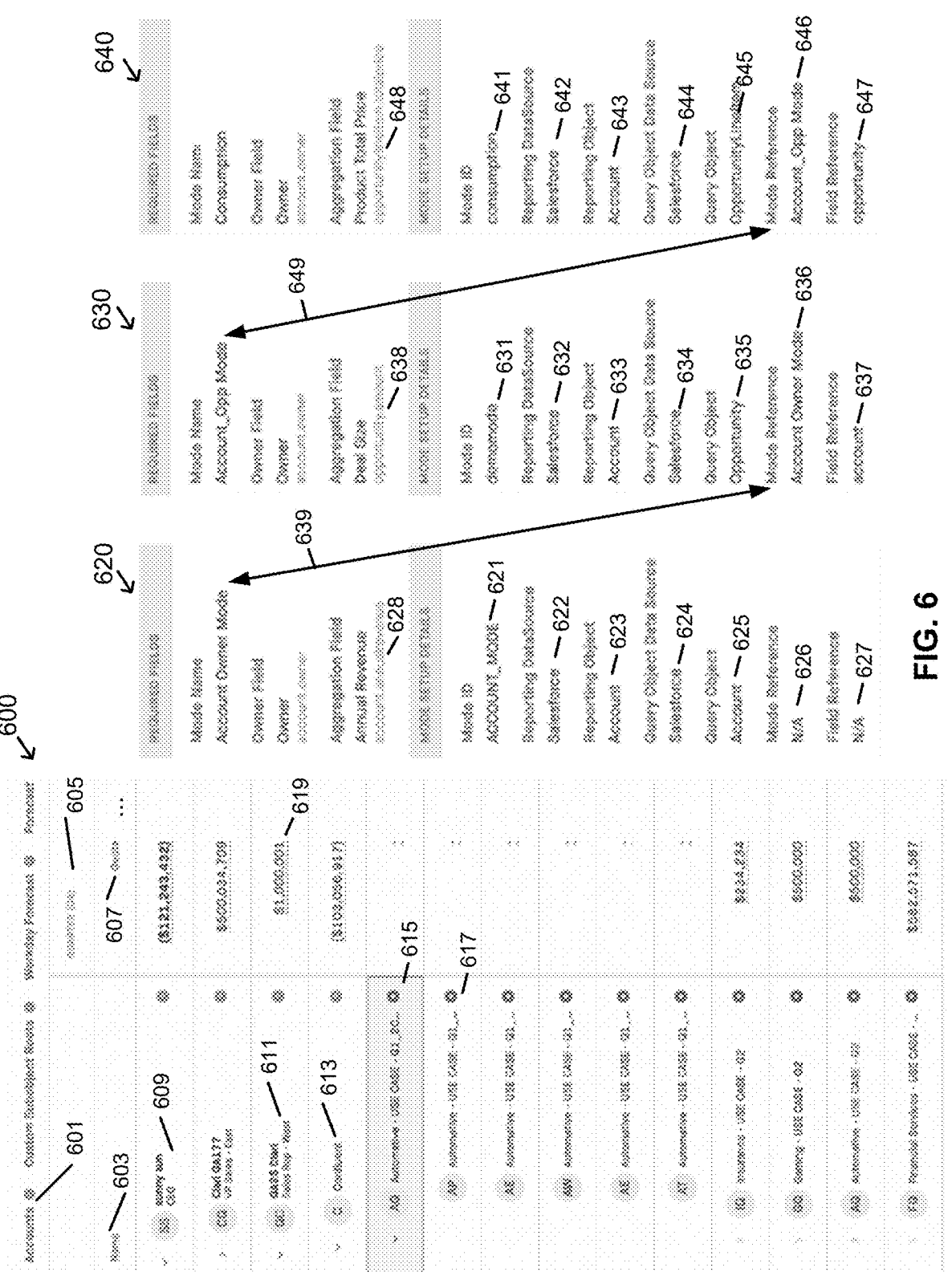
FIG. 6 illustrates a user interface specifying three granular forecast levels and corresponding mode configurations according to some embodiments.
Figure 7:
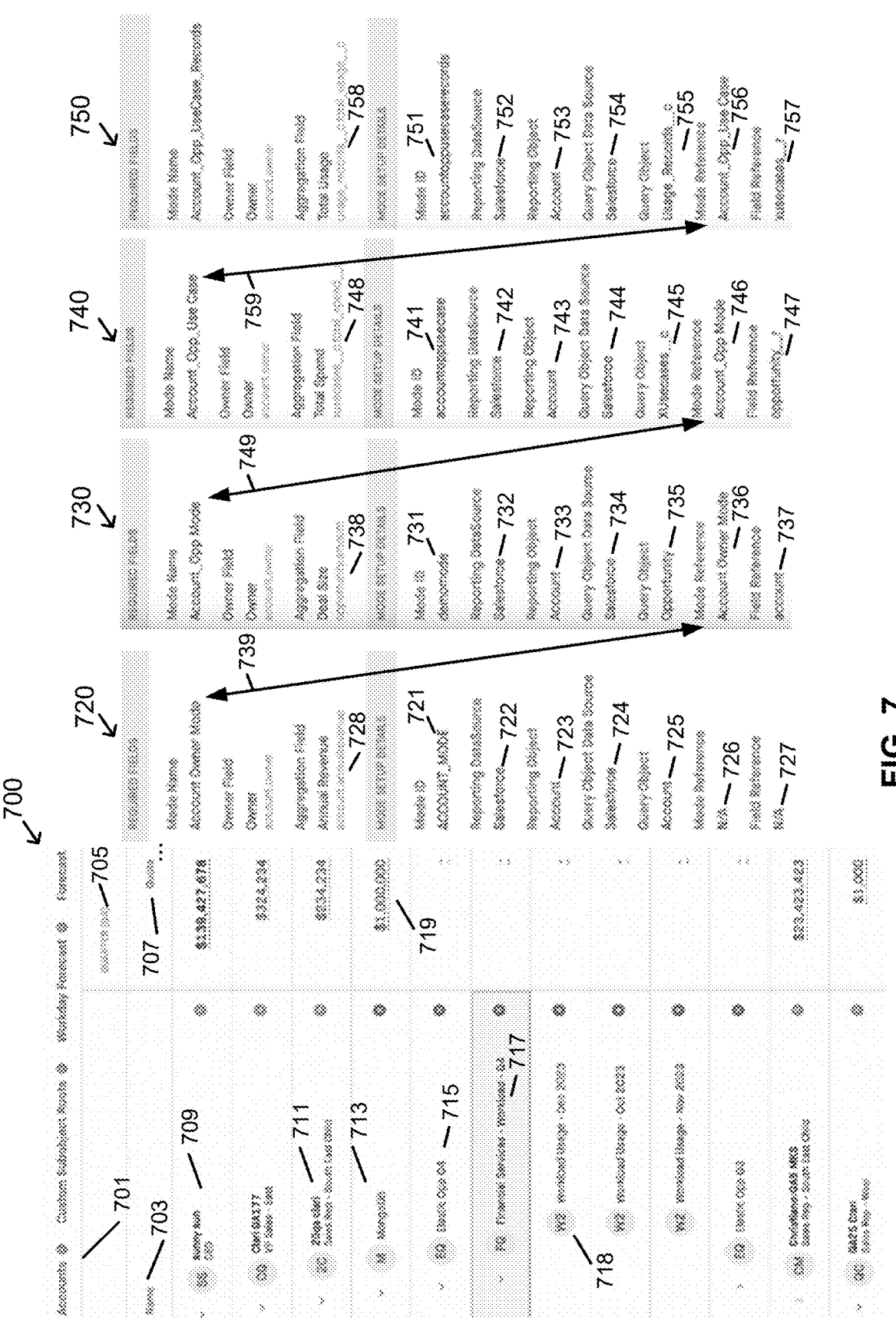
FIG. 7 illustrates a user interface specifying fourth granular forecast levels and corresponding mode configurations according to some embodiments.

FIG. 4A illustrates a user interface 400 with forecast values specified for account entities according to one embodiment. The account entities can correspond to the client accounts of a sales department of an organization. Referring to FIG. 4A, UI 400 can include a plurality of display tabs 401 (accounts, custom subobject roots, workday forecast, forecast, consumption, use case, field calculation, etc.). In this example, the Accounts display tab shows sales metrics for the time duration of the fourth quarter (Q4) 405. UI 400 can include name column 403 displaying various entity levels 409-413 and metric columns 407 (pipeline field, gaps to go, committed deals, read only) displaying metrics for these entity levels 409-413. Entity level 409 specifies the sales representative (or group of sales representative) with the highest authorization, entity level 411 specifies the sales rep (or group of sales representative) that is subordinate to entity level 409. Entity level 413 specifies the sales accounts managed by sales reps 411. Here, forecast values can be specified for any of the entities for any of columns 407. For example, an end-user can click on label 415 to enter a forecast value. The forecast value can then be created and stored in a data store, such as data store 130 of FIGS. 1A-1B, against the measurement metric (label 417) associated to the forecast value. Label 417 can refer to a measurement metric retrievable from a data source. In one embodiment, the displayed entity hierarchy of UI 400 can be specified by mode configuration as shown in the mode configuration setting (e.g., JSON) 430 of FIG. 4B. Here, the entity hierarchy specified by mode configuration 430 is sales reps (parent) to accounts (child). Referring to FIG. 4B, JSON 430 can include a plurality of name-value pairs. The mode configuration JSON 430 can be configured/viewed by an end-user via a mode configuration GUI 450 of FIG. 4C. Referring to FIGS. 4A-4C, one mode configuration is specified by the end-user. The mode configuration has name-value pairs: 'id': 'ACCOUNT_MODE', 'displayName': 'Account', 'defaultOwnerField': 'account.owner', 'defaultRollUpField': 'account.annualrevenue', 'showCount': true, 'includeInAnalytics': false, 'listLabel': 'Account', 'queryObject': 'Account', 'reportingObject': 'Account'. Mode identifier (ID) field can uniquely identify a mode configuration, with a particular name ('displayName') displayed for the mode configuration. The 'defaultOwnerField' field can specify an ownership (e.g., end-user) for the mode configuration that associates a reporting (object) entity to a query (object) entity. The defaultRollUpField field can specify a roll up field for aggregation. The 'reportingObject' field can specify a highest object granularity (e.g., parent entity) for the mode configuration. The 'queryObject' field can specify a lowest object granularity (e.g., child entity) for the mode configuration. Here, mode configuration JSON 430 has a single mode configuration chain. The mode configuration JSON 430 specifies UI 400 to display account entities (e.g., 413) for a user group (e.g., 411), e.g., account.owner. FIGS. 6-7 further show multiple mode configurations linked among multiple chains when there are sub-entities below the Account entity in a drilldown operation.

In one embodiment, when there are more than one mode configuration chains, a configuration mode reference "containerModeRef" in the mode configuration setting JSON can be used to specify the links between the mode configuration chains. FIG. 5 illustrates an example of a mode configuration JSON according to one embodiment. JSON 500 can represent a mode that can link to another mode by reference, 'containerModeRef' can include 'modeId' and 'fieldId'. 'ModeId' can uniquely identify a reference parent mode configuration and 'fieldId' can identify a field to filter by for the current mode configuration. E.g., the 'fieldId' can specify a filter value so query objects (entities) that satisfy a filter operation with the filter value are shown in a UI. For example, when the filter value specifies a particular account id, the query objects (entities) associated with the account id (in the same account) are displayed. Further examples are shown in FIGS. 6-7.

FIG. 6 illustrates a user interface specifying three granular forecast levels and corresponding mode configurations according to some embodiments. Referring to FIG. 6, UI 600 can represent UI 400 of FIG. 4A. In one embodiment, UI 600 includes a plurality of display tabs 601 ('Accounts', 'Custom Subobject Roots', 'Workday Forecast', 'Forecast', etc.). The 'Accounts' display tab shows sales metrics for the time duration of the fourth quarter (Q4) 605. UI 600 includes name 603 displaying various entities 609-617 in a hierarchy manner configurable by mode configurations 620, 630, 640. In this example, UI 600 includes column 607 ('quota') for purposes of illustration, but UI 600 can include other columns retrievable from data source(s). Forecast values 619 for the measurement metrics (not shown) of field 'quota' are shown for entity levels 609-617. As previously described, for the user hierarchy of organizational users, entity level 609 specifies the user (CEO) with the highest authorization within the organization. Entity level 611 specifies a user (sales rep or group) that is subordinate to entity level 609. Entity level 613 specifies the sales accounts managed by sales reps of level 611. Here, forecast values can be specified for any of the entities for any of columns 607. For example, an end-user can click on label 419 to enter a forecast value. The forecast value can be stored against the measurement metric in a data store, such as data store 130 of FIGS. 1A-1B. the forecast values of sub-entities one level below can be summed to derive an aggregate forecast value (an initial forecast value) for an entity at a current level. Although only a forecast value is shown in FIG. 6, different measurement metrics, forecast values, and/or aggregate forecast values can be shown similar to that of FIG. 4A.

In one embodiment, the displayed entity hierarchy levels 609-617 of UI 600 are specified by mode configurations 620, 630, and 640. Referring to FIG. 6, mode configuration 620 can specify the drilldown behavior corresponding to entity level 611 such that when an end-user clicks on component "QA25 Clari" at level 611, processing logic retrieves mode configuration 620 to obtain drilldown information from fields 621-628 for this component. For example, mode configuration 620 can specify a required mode (e.g., a first (head) mode in a chain of modes) and mode configuration 620 includes "Mode ID": "ACCOUNT_MODE", "Reporting DataSource": "SalesForce", "Reporting Object": "Account", "Query DataSource": "SalesForce", "Query Object": "Account", "Mode Reference": "N/A", and "Field Reference": "N/A". Here, ID specifies a unique identifier for the mode configuration. Reporting data source specifies the data source of the parent entity and reporting object specifies the name of the parent entity. Query data source specifies the data source of the child entity and query object specifies the name of the child entity. Note that the reporting and the query entities can be retrieved from separate data sources.

Mode Reference specifies a parent mode configuration to link to this mode configuration and Field Reference specifies a field (column) to filter the retrieved entities for display at a UI. In this case, the UI drilldown may be preset for organizational users. The account entity is thus the first mode, and the mode reference and/or field reference for the account entity is specified as not available ("N/A"). Aggregation field 628 specifies the field to aggregate for display. In one embodiment, aggregation field 628 specifies the forecast aggregate value. E.g., the values of items at sublevels are summed to derive the aggregate value for the item at the current level. In one embodiment, aggregation field 628 specifies the aggregate value for measurement metrics.

Referring to FIG. 6, mode configuration 630 can specify the drilldown corresponding to entity level 613 such that when an end-user clicks on component 'Confluent' at entity level 613, processing logic retrieves mode configuration 630 to obtain drilldown information from fields 631-638 for this component. In this case, mode configuration 630 specifies the reporting object as 'Account' and the query object as 'Opportunity'. Thus, mode configuration 630 specifies Account entity to be the parent level and the Opportunity entity to be the child level.

Mode Reference "Account Owner Mode" 636 specifies a link 639 linking mode configuration 630 to mode configuration 620. Field Reference 'account' specifies the query object 'opportunity' are filtered according to the field value 'Confluent' when the end-user drills down. Here, opportunity entities 615 corresponding to the 'account' of 'Confluent' would be displayed when an end-user drills down this account entity.

Referring to FIG. 6, similarly, mode configuration 640 can specify the drilldown corresponding to entity level 615 such that when an end-user clicks on component "Automotive—USE CASE—Q1 . . . " at entity level 615, processing logic retrieves mode configuration 640 to obtain drilldown information from fields 641-648 for this component. In this case, mode configuration 640 specifies the reporting object as 'Account' and the query object as 'OpportunityLineItem'. Thus, mode configuration 640 specifies Account entity as the parent and the 'OpportunityLineItem' entity as the child entity.

Mode Reference "Account_Opp Mode" 646 specifies a link 649 linking mode configuration 640 to mode configuration 630. Field Reference 'opportunity' specifies the query objects are filtered according to the field value 'opportunity' of "Automotive—USE CASE—Q1 . . . " when the drilldown is being displayed in a UI. Here, sub-opportunity entities 617 corresponding to "Automotive—USE CASE—Q1 . . . " from a query data source would be displayed when an end-user drills down this opportunity entity.

In one embodiment, when an end-user performs a drill-down for display tab 601, by clicking on a user entity (e., at entity level 611), processing logic retrieves mode configurations (such as 620, 630, and 640) for the user from a data store. The mode configurations 620, 630, and 640 specifying the references, e.g., references 636 and 646, allows process-ing logic to determine which modes are linked to one another, e.g., mode chaining. Having determined the mode chaining information, processing logic can retrieve the query objects for a corresponding mode (e.g., database entries with ownership as the user entity, matching the query objects in the mode, and filtered by the value of the field reference in the mode) when the end-user clicks on an entity of the corresponding mode. In some embodiments, the query object(s) has entity relationship to the reporting object in a one-to-one (e.g., only one query object is retrieved for the reporting object) or one-to-many (e.g., multiple query objects are retrieved for the reporting object) manner. Pro-cessing logic can then display a drill down for the retrieved query objects.

An end-user can further specify forecast values for any measurement metrics displayed for the query objects. Here, a label for a forecast value for any of columns 607 allows the end-user to enter forecast values for any of the correspond-ing measurement metrics. In one embodiment, the forecast values are stored against a measure metric in a data store, such as data store 130 of FIG. 1. In one embodiment, a forecast value can be stored for a field (column) for a named entity (row) specific to an end-user when the end-user keys in the forecast value in UI 600. In one embodiment, forecast values are stored in a NoSQL database. In one embodiment, processing logic can co-relate other entities that make up the user forecast value against which the user forecasts. E.g., the end-user can provide a forecast for a current entity using forecast values for other entities (e.g., sub-entities or sibling entities of a same level). The co-relating can lead to more accurate forecast values.

Although this example illustrates a hierarchy of organi-zational users and entities for sales, UI 600 can be adapted for other organizational data (consumption, usage, revenue goals, growth forecast, etc.), where the forecast values are retrievable from a different data source separate from the data source for the entity data of the organization.

FIG. 7 illustrates a user interface specifying four granular forecast levels and corresponding mode configurations according to some embodiments. Referring to FIG. 7, UI 700 can represent UI 600 of FIG. 6. In one embodiment, UI 700 includes a plurality of display tabs 701 ('Accounts', 'Custom Subobject Roots', 'Workday Forecast', 'Forecast', etc.). The 'Accounts' display tab shows consumption usage metrics for the fourth quarter (Q4) 705. UI 700 includes name 703 displaying various entities 709-718 in a hierarchy manner configurable by mode configurations 720, 730, 740, and 750. In this example, UI 700 includes column 707 ('quota') for purposes of illustration, but UI 700 can include other columns retrievable from data source(s). Forecast values 719 for the measurement metrics (not shown) of field 'quota' are shown for entity levels 709-718. Similar to entity levels 609-611 of FIG. 6, entity level 709 specifies the user (CEO) with the highest authorization within the organiza-tion. Entity level 711 specifies a user (sales rep or group) that is subordinate to entity level 709. Entity level 713 specifies the sales accounts managed by sales reps of level 711. Here, forecast values can be specified for any of columns 707 and for any of the entities. For example, an end-user can click on label 719 to enter a forecast value. The forecast value can then be stored in a data store, such as data store 130 of FIGS. 1A-1B. Here, for ease of illustration, the measurement metrics and aggregate forecast values are not shown, but can be shown similar to that of FIG. 4A.

In one embodiment, the displayed entity hierarchy levels 709-718 of UI 700 are specified by mode configurations 720, 730, 740, and 750. Referring to FIG. 7, mode configuration 720 can specify the drilldown behavior corresponding to entity level 711 such that when an end-user clicks on component "qa20 clari" at level 711, processing logic retrieves mode configuration 720 to obtain drilldown infor-mation from fields 721-728 for this component. For example, mode configuration 720 can specify a required mode (e.g., a first (head) mode in a chain of modes) and mode configuration 720 can include values for "Mode ID", "Reporting DataSource", "Reporting Object", "Query Data-Source", "Query Object", "Mode Reference", and "Field Reference". As described above, ID specifies a unique name for the mode configuration. Reporting data source specifies the data source of the parent entity and reporting object specifies the name of the parent entity. Query data source specifies the data source of the child entity and query object specifies the name of the child entity. Note that the reporting and the query entities can be retrieved from separate data sources.

Mode Reference can specify a parent mode configuration to link to this mode configuration and Field Reference can specify a field (column) to filter the retrieved entities for display at UI 700. In one embodiment, aggregation field 728 specifies the forecast aggregate value. E.g., the values of components at sub-levels are summed to derive the aggre-gate value for the component at the current level. In one embodiment, aggregation field 728 specifies the aggregate value for measurement metrics.

Referring to FIG. 7, mode configuration 730 can specify the drilldown corresponding to entity level 713 such that when an end-user clicks on component 'MongoDB' at entity level 713, processing logic retrieves mode configuration 730 to obtain drilldown information from fields 731-738 for this component. In this case, mode configuration 730 specifies the reporting object as 'Account' and the query object as 'Opportunity'. Thus, mode configuration 730 specifies Account entity to be the parent level and the Opportunity entity to be the child level.

Mode Reference "Account Owner Mode" 736 can specify a link 739 linking mode configuration 730 to mode configu-ration 720. Field Reference 'account' can specify the query object 'Opportunity' are filtered according to the field value 'MongoDB' when the end-user drills down. Here, opportu-nity entities "Elastic Opp Q4" "Elastic Opp Q3" 715 cor-responding to the 'account' of 'MongoDB' would be dis-played when an end-user drills down this entity.

Referring to FIG. 7, similarly, mode configuration 740 can specify the drilldown corresponding to entity level 715 such that when an end-user clicks on component "Elastic Opp Q4" at entity level 715, processing logic retrieves mode configuration 740 to obtain drilldown information from fields 741-748 for this component. In this case, mode configuration 740 specifies the reporting object as 'Account' and the query object as "XUseCases_c". Thus, mode con-figuration 740 specifies Account entity as the parent and the "XUseCases" entity as the child entity. Note that "_c"

represents a custom object. E.g., a custom object name is a variable with the syntax CustomObject_c.

Mode Reference "Account_Opp Mode" 746 specifies a link 749 linking mode configuration 740 to mode configuration 730. Field Reference 'opportunity_r' specifies query objects are filtered according to the field value 'opportunity' of "Elastic Opp Q4" when the drilldown is being displayed in a UI. Here, sub-opportunity entities 717 corresponding to "Elastic Opp Q4" from a query data source would be displayed when an end-user drills down this entity. Note that "_r" represents a related parent object. E.g., a related parent object name is a variable with the syntax ParentObject_r.

Referring to FIG. 7, similarly, mode configuration 750 can specify the drilldown corresponding to entity level 717 such that when an end-user clicks on component "Financial Services—Workload—Q4" at entity level 715, processing logic retrieves mode configuration 750 to obtain drilldown information from fields 751-758 for this component. In this case, mode configuration 750 specifies the reporting object as 'Account' and the query object as "Usage_Records_c". Thus, mode configuration 750 specifies Account entity as the parent and the "Usage_Records" entity as the child entity.

Mode Reference "Account_Opp_Use Case" 756 can specify a link 759 linking mode configuration 750 to mode configuration 740. Field Reference 'xusecases_r' can specify query objects are filtered according to the field value 'xusescases of "Financial Services—Workload—Q4" when the drilldown is being displayed in a UI. Here, sub-opportunity entities 718 corresponding to "Financial Services—Workload—Q4" from a query data source would be displayed when an end-user drills down this entity.

In one embodiment, when an end-user performs a drilldown for display tab 701, by clicking on a user entity (e., at entity level 711), processing logic retrieves mode configurations (such as 720, 730, 740, and 750) for the user from a data store. The mode configurations 720, 730, 740, and 750 specifying the references, e.g., references 736, 746, and 756, allows processing logic to determine which modes are linked to one another, e.g., mode chaining. Having determined the mode chaining information, processing logic can retrieve the query objects for a corresponding mode when an end-user clicks on an entity of the corresponding mode. E.g., database entries with ownership as the user entity, matching the query objects in the mode, and filtered by the value of the field reference in the mode are retrieved. In some embodiments, the query object(s) has entity relationship to the reporting object in a one-to-one (e.g., only one query object is retrieved for the reporting object) or one-to-many (e.g., multiple query objects are retrieved for the reporting object) manner. Processing logic can then display a drill down for the retrieved query objects in the one-to-one or one-to-many manner.

An end-user can further enter forecast values for any measurement metrics displayed for the query objects. Here, a label for a forecast value for any of columns 707 allows the end-user to add forecast values to corresponding measurement metrics. In one embodiment, the forecast values are stored in a data store, such as data store 130 of FIG. 1. In one embodiment, a forecast value can be stored for a field (column) corresponding to a named entity (row) for an end-user when the end-user keys in a forecast value in UI 700. In one embodiment, forecast values are stored in a NoSQL database. In one embodiment, processing logic can co-relate other entities that make up the user forecast value against which the user forecasts. E.g., the end-user can provide a forecast for a current entity using forecast values for other entities. The co-relating can lead to more accurate forecast values.

Although this example illustrates a hierarchy of organizational users and entities for sales, UI 700 can be adapted for other organizational data (consumption, usage, revenue goals, growth forecast, etc.), where the forecast values are retrievable from a different data source separate from the data source for the entity data of the organization.

FIG. 8 is a flow diagram illustrating a process 800 to display a UI with mode chaining according to some embodiments. Process 800 may be performed by processing logic which may include software, hardware, or a combination thereof. For example, process 800 may be performed by forecast interface engine 200 of FIG. 2.

Referring to FIG. 8, at block 801, processing logic queries for entity data of a user from a first data source.

At block 803, processing logic displays a display panel in a user interface (UI), the display panel comprising measurement metrics for an account entity of the user from the entity data of the first data source.

At block 805, processing logic determines mode chaining information that specifies a chain of entity relationships between a plurality of entities (e.g., reporting object and query object(s)) in the entity data, wherein the relationships include one-to-one or one-to-many relationships.

At block 807, processing logic determines forecast information corresponding to the measurement metrics for the plurality of entities of the user.

At block 809, processing logic displays the forecast information as entity-based forecast values in the UI based on the mode chaining information, where the entity-based forecast values comprise a drill down of forecast values for the plurality of entities (reporting object and/or query object(s) of a configuration mode at the drill down) of the user.

In one embodiment, determining the mode chaining information that specifies the chain of entity relationships includes determining a first mode for a reporting entity displayed at the UI, determining a first link that references the first mode, wherein the first link corresponds to a second mode with a mode reference entry referencing the first mode and the second mode specifies at least one query entity and a reporting entity for a drill down operation at the UI, and retrieving one or more first query entities of the second mode for the user.

In one embodiment, processing logic further determines a first field identifier specifying a referenced field for the first link and retrieves the one or more first query entities of the second mode for the user filtered by the first field identifier.

In one embodiment, the first field identifier is determined to correspond to the at least one query entity of the first mode and the drill-down operation performed by the user at the UI comprises performing an action on the UI corresponding to an actionable UI component for the query entity of the first mode.

In one embodiment, determining the mode chaining information that specifies the chain of entity relationships further includes determining a second link that references the second mode, where the second link corresponds to a third mode with a mode reference entry referencing the second mode and the third mode specifies at least a query entity and a reporting entity for a drill down operation at the UI, and retrieving one or more second query entities of the third mode for the user.

In one embodiment, processing logic further determines a second field identifier specifying a referenced field for the second link and retrieves the one or more second query entities of the third mode for the user filtered by the second field identifier.

In one embodiment, the second field identifier is determined to correspond to the query entity of the second mode and the drill-down operation performed by the user at the UI comprises performing an action on the UI corresponding to an actionable UI component for the query entity of the second mode.

In one embodiment, determining the mode chaining information that specifies the chain of entity relationships further includes determining a third link that references the third mode, where the third link corresponds to a fourth mode with a mode reference entry referencing the third mode and the third mode specifies at least a query entity and a reporting entity for a drill down operation at the UI, and retrieving one or more third query entities of the fourth mode for the user.

In one embodiment, processing logic further determines a third field identifier specifying a referenced field for the third link and retrieves the one or more third query entities of the fourth mode for the user grouped by the third field identifier.

In one embodiment, the third field identifier is determined to correspond to the query entity of the third mode and the drill-down operation performed by the user at the UI comprises performing an action on the UI corresponding to an actionable UI component for the query entity of the third mode.

In one embodiment, the forecast information are stored in a second data source and determining the forecast information comprises retrieving the forecast information from the second data source.

In one embodiment, the measurement metrics of an entity are disposed on the UI besides forecast values for the entity.

In one embodiment, the measurement metrics of other entities related to the current entity are disposed on the UI besides the forecast value for the other entities.

In one embodiment, the first, second, and third query entities are displayed sequentially in a drill-down hierarchy in response to the drill-down operation.

In one embodiment, the first query entities are custom entities, opportunity entities, or sub-opportunity entities of the account entity and the first forecast values forecast a measurement value for the custom entities, opportunity entities, or sub-opportunity entities of the account entity for a predetermined timeframe.

In one embodiment, the first forecast values specify one of a consumption value, a measurement value, or a sales value.

Note that some or all of the components as shown and described above (e.g., forecast interface engine 200 of FIG. 2, and user interface 110 of FIGS. 1A-1B) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In some embodiments, an entity can include a user group, an organization, a unit or department of an organization, an opportunity, a sub-opportunity, or any subordinate category to the sub-opportunity or thereof.

Figure 9:
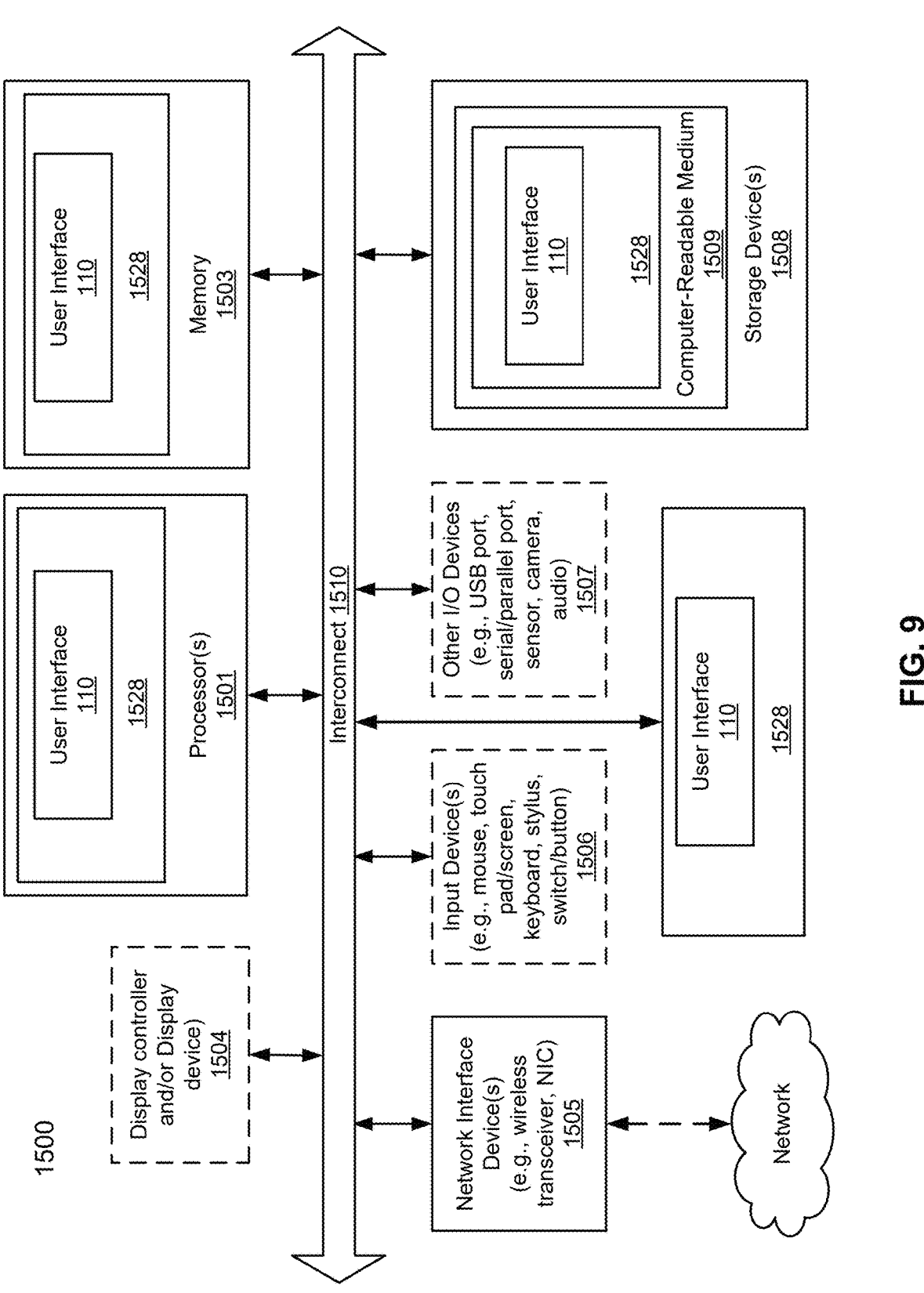
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, client devices 101-102 and server 104 of FIGS. 1A-B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OSR/iOS® from Apple, Android™ from Google™, Linux, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com- puting device, that manipulates and transforms data represented as physical (electronic) quantities within the com- puter system's registers and memories into other data similarly represented as physical quantities within the com- puter system memories or registers or other such informa- tion storage, transmission or display devices.

Embodiments of the invention also relate to an apparatus for performing the operations herein. Such a computer program is stored in a non-transitory computer readable medium. A machine-readable medium includes any mecha- nism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera- tions described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the inven- tion have been described with reference to specific exem- plary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to configure customi- zable forecast granularities, the method comprising:

querying, by at least one processor, for entity data of a user from a first data source;

displaying, by a display device, a display panel in a user interface (UI) of the display device, the display panel comprising measurement metrics for an account entity of the user from the entity data of the first data source;

determining, by the processor, availability of preset mode chaining information from the entity data; determining, by the processor, the mode chaining infor- mation that specifies a chain of entity relationships between a plurality of entities in the entity data, wherein the relationships include one-to-one or one-to- many relationships, wherein the mode chaining infor- mation includes a sequence of modes connected through mode references, the sequence of modes speci- fies a customizable sequence of a plurality of customi- zable modes; and determining, by the processor, forecast information cor- responding to the measurement metrics for the plurality of entities of the user from a second data source, the forecast information including entity-based forecast values following the chain of entity relationships between the plurality of entities in the entity data;

displaying, by the display device, the forecast information as entity-based forecast values in the UI of the display device based on the mode chaining information, wherein the entity-based forecast values comprise cor- responding actionable drill downs of forecast values for the plurality of entities of the user to be displayed in the UI of the display device for customizable forecast granularities.

2. The method of claim 1, wherein determining the mode chaining information that specifies the chain of entity rela- tionships comprises:

determining a first mode for a first reporting entity dis- played at the UI, the first mode associated to a first query entity;

determining a second mode that references the first mode, the second mode comprising a mode reference entry specifying a first link that references the first mode, wherein the second mode specifies one or more second query entities and a second reporting entity for a drill down operation at the UI, wherein the drill down operation is performed to display the drill down; and retrieving the one or more second query entities of the second mode for the user.

3. The method of claim 2, further comprising:

determining a first field identifier specifying a referenced field for the first link; and retrieving the one or more second query entities of the second mode for the user filtered by the first field identifier.

4. The method of claim 3, wherein the first field identifier is determined to correspond to the first query entity of the first mode and the drill down operation performed at the UI comprises performing an action on the UI corresponding to an actionable UI component for the first query entity of the first mode.

5. The method of claim 2, wherein determining the mode chaining information that specifies the chain of entity rela- tionships further comprises:

determining a third mode that references the second mode, the third mode comprising a mode reference entry specifying a second link that references the second mode and the third mode specifies one or more third query entities and a third reporting entity for a drill down operation at the UI, wherein the drill down operation is performed to display the drill down; and retrieving the one or more third query entities of the third mode for the user.

6. The method of claim 5, further comprising:

determining a second field identifier specifying a refer- enced field for the second link; and retrieving the one or more third query entities of the third mode for the user filtered by the second field identifier.

7. The method of claim 6, wherein the second field identifier is determined to correspond to the second query entities of the second mode and the drill down operation performed at the UI comprises performing an action on the UI corresponding to an actionable UI component for the second query entities of the second mode.

8. The method of claim 5, wherein determining the mode chaining information that specifies the chain of entity relationships further comprises:

determining a fourth mode that references the third mode, the fourth mode comprising a mode reference entry specifying a third link that references the third mode and the third mode specifies one or more fourth query entities and a fourth reporting entity for a drill down operation at the UI, wherein the drill down operation is performed to display the drill down; and retrieving the one or more fourth query entities of the fourth mode for the user.

9. The method of claim 8, further comprising:

determining a third field identifier specifying a referenced field for the third link; and retrieving the one or more fourth query entities of the fourth mode for the user grouped by the third field identifier.

10. The method of claim 9, wherein the third field identifier is determined to correspond to the third query entities of the third mode and the drill down operation performed at the UI includes performing an action on the UI corresponding to an actionable UI component for the third query entities of the third mode.

11. The method of claim 8, wherein the forecast information are stored in the second data source and determining the forecast information comprises retrieving the forecast information from the second data source corresponding to the measurement metrics for the plurality of entities of the user.

12. The method of claim 8, wherein the measurement metrics of the plurality of entities of the user are disposed on the UI besides forecast values for the respective entities.

13. The method of claim 8, wherein the measurement metrics of other entities related to a current entity are disposed on the UI besides forecast values for the other entities.

14. The method of claim 8, wherein the second, third, and fourth query entities are displayed sequentially in a drill-down hierarchy in response to the drill down operation.

15. The method of claim 2, wherein the second query entities are custom entities, opportunity entities, or sub-opportunity entities of the account entity and the forecast values forecast a measurement value for the custom entities, opportunity entities, or sub-opportunity entities of the account entity for a predetermined timeframe.

16. The method of claim 2, wherein the first forecast values specify one of a consumption value, a measurement value, or a sales value.

17. A non-transitory machine-readable medium having instructions stored therein, which when executed by a processor, causing the processor to perform operations, the operations comprising:

querying for entity data of a user from a first data source;

displaying a display panel in a user interface (UI), the display panel comprising measurement metrics for an account entity of the user from the entity data of the first data source;

determining mode chaining information that specifies a chain of entity relationships between a plurality of entities in the entity data, wherein the relationships include one-to-one or one-to-many relationships, wherein the mode chaining information includes a sequence of modes connected through mode references, the sequence of modes specifies a customizable sequence of a plurality of customizable modes; and determining forecast information corresponding to the measurement metrics for the plurality of entities of the user from a second data source, the forecast information including entity-based forecast values following the chain of entity relationships between the plurality of entities in the entity data;

displaying the forecast information as entity-based forecast values in the UI based on the mode chaining information, wherein the entity-based forecast values comprise corresponding actionable drill downs of forecast values for the plurality of entities of the user to be displayed in the UI for customizable forecast granularities.

18. The machine-readable medium of claim 17, wherein determining the mode chaining information that specifies the chain of entity relationships comprises:

determining a first mode for a first reporting entity displayed at the UI, the first mode associated to a first query entity;

determining a second mode that references the first mode, the second mode comprising a mode reference entry specifying a first link that references the first mode, wherein the second mode specifies one or more second query entities and a second reporting entity for a drill down operation at the UI, wherein the drill down operation is performed to display the drill down; and retrieving the one or more second query entities of the second mode for the user.

19. A system comprising:

one or more processors; and a non-transitory storage medium comprising executable instructions, which when executed by the one or more processors, causes the one or more processors to perform operations, the operations comprising:

querying for entity data of a user from a first data source;

displaying a display panel in a user interface (UI), the display panel comprising measurement metrics for an account entity of the user from the entity data of the first data source;

determining mode chaining information that specifies a chain of entity relationships between a plurality of entities in the entity data, wherein the relationships include one-to-one or one-to-many relationships, wherein the mode chaining information includes a sequence of modes connected through mode references, the sequence of modes specifies a customizable sequence of a plurality of customizable modes; and determining forecast information corresponding to the measurement metrics for the plurality of entities of the user from a second data source, the forecast information including entity-based forecast values following the chain of entity relationships between the plurality of entities in the entity data;

displaying the forecast information as entity-based forecast values in the UI based on the mode chaining information, wherein the entity-based forecast values comprise corresponding actionable drill downs of forecast values for the plurality of entities of the user to be displayed in the UI for customizable forecast granularities.

20. The system of claim 19, wherein determining the mode chaining information that specifies the chain of entity relationships comprises:

determining a first mode for a first reporting entity displayed at the UI, the first mode associated to a first query entity;

determining a second mode that references the first mode, the second mode comprising a mode reference entry specifying a first link that references the first mode, wherein the second mode specifies one or more second query entities and a second reporting entity for a drill down operation at the UI, wherein the drill down operation is performed to display the drill down; and retrieving the one or more second query entities of the second mode for the user.

\* \* \* \* \*